US011265261B2

(12) United States Patent
Charles et al.

(10) Patent No.: US 11,265,261 B2
(45) Date of Patent: Mar. 1, 2022

(54) ACCESS PATH MANAGEMENT BASED ON PATH CONDITION

(71) Applicant: EMC IP Holding Company LLC, Hopkinton, MA (US)

(72) Inventors: Peniel Charles, Bangalore (IN); Joseph G. Kanjirathinkal, Cary, NC (US); Manikandan Sethuraman, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/822,208

(22) Filed: Mar. 18, 2020

(65) Prior Publication Data
US 2021/0297363 A1    Sep. 23, 2021

(51) Int. Cl.
| | |
|---|---|
| *H04L 12/717* | (2013.01) |
| *H04L 47/74* | (2022.01) |
| *H04L 47/78* | (2022.01) |
| *H04L 67/1097* | (2022.01) |
| *H04L 45/42* | (2022.01) |

(Continued)

(52) U.S. Cl.
CPC ............ *H04L 47/745* (2013.01); *H04L 45/24* (2013.01); *H04L 45/42* (2013.01); *H04L 47/726* (2013.01); *H04L 47/781* (2013.01); *H04L 67/1097* (2013.01)

(58) Field of Classification Search
CPC ....... H04L 45/24; H04L 45/42; H04L 47/726; H04L 47/781; H04L 67/1097
See application file for complete search history.

(56) References Cited

U.S. PATENT DOCUMENTS

| | | |
|---|---|---|
| 6,567,397 B1 | 5/2003 | Campana et al. |
| 6,687,746 B1 | 2/2004 | Shuster et al. |
| 6,697,875 B1 | 2/2004 | Wilson |

(Continued)

FOREIGN PATENT DOCUMENTS

| | | |
|---|---|---|
| CN | 103677927 B | 2/2017 |
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Aftab N. Khan
(74) *Attorney, Agent, or Firm* — Ryan, Mason & Lewis, LLP

(57) ABSTRACT

Access path management is provided based on one or more path conditions in an information processing system. For example, an apparatus comprises a storage system comprising a processor coupled to a memory. The storage system is configured to communicate over a network with one or more host devices. The storage system is further configured to obtain notification from one of the one or more host devices that a first path through the network between the storage system and the given one of the one or more host devices is at least temporarily unreliable. The storage system is further configured to cause a path state change for the first path from a first state to a second state and a path state change for a second path to the first state.

20 Claims, 5 Drawing Sheets

(51) Int. Cl.
H04L 45/24 (2022.01)
H04L 47/726 (2022.01)

(56) References Cited

U.S. PATENT DOCUMENTS

| | | |
|---|---|---|
| 7,275,103 B1 | 9/2007 | Thrasher et al. |
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,400,611 B1 | 7/2016 | Raizen |
| 9,594,780 B1 | 3/2017 | Esposito et al. |
| 9,647,933 B1 | 5/2017 | Tawri et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,639 B2 | 12/2019 | Mallick et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2006/0026346 A1 | 2/2006 | Kadoiri et al. |
| 2006/0215552 A1* | 9/2006 | Iwata ............ H04L 41/00 370/229 |
| 2006/0277383 A1 | 12/2006 | Hayden et al. |
| 2007/0067516 A1* | 3/2007 | Do ............ G06F 11/201 710/74 |
| 2007/0174849 A1 | 7/2007 | Cheung et al. |
| 2008/0043973 A1 | 2/2008 | Lai et al. |
| 2008/0201458 A1 | 8/2008 | Salli |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0254482 A1* | 10/2012 | Kabakura ............ G06F 3/0683 710/38 |
| 2013/0117766 A1 | 5/2013 | Bax et al. |
| 2014/0105068 A1 | 4/2014 | Xu |
| 2015/0058558 A1* | 2/2015 | Fu ............ G06F 3/0689 711/114 |
| 2015/0106504 A1* | 4/2015 | Astigarraga ......... H04L 41/046 709/224 |
| 2015/0169249 A1* | 6/2015 | Kalman ............ H04L 45/42 710/38 |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0052709 A1* | 2/2017 | Kawamura ............ G06F 3/061 |
| 2017/0235507 A1 | 8/2017 | Sinha et al. |
| 2017/0277439 A1* | 9/2017 | Kalman ............ G06F 3/061 |
| 2017/0318092 A1* | 11/2017 | Maredia ............ H04L 47/70 |
| 2018/0088809 A1* | 3/2018 | Liu ............ H04L 41/0663 |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |

OTHER PUBLICATIONS

NVM Express, "NVM Express, Revision 1.3," NVM Express, May 1, 2017, 282 pages.

Vmware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

Vmware, Inc. "VMware VMFS Volume Management," 2009, 8 pages.

Dell EMC, "Dell EMC Unity: Virtualization Integration," Technical White Paper, Oct. 2019, 39 pages.

U.S. Appl. No. 15/795,653 filed in the name of Maneesh Pusalkar et al. Oct. 27, 2017, and entitled "Storage System with Network-Wide Configurable Device Names."

U.S. Appl. No. 16/142,274 filed in the name of Sanjib Mallick et al. Sep. 26, 2018, and entitled "Host Device with Multi-Path Layer Implementing Automatic Standby Setting for Active-Active Configuration."

U.S. Appl. No. 16/145,502 filed in the name of Vinay G. Rao et al. Sep. 28, 2018, and entitled "Host Device with Multi-Path Layer Implementing Path Selection Based At Least In Part on Fabric Identifiers."

U.S. Appl. No. 16/155,429 filed in the name of Rimpesh Patel et al. Oct. 9, 2018, and entitled "Categorizing Host IO Load Pattern and Communicating Categorization to Storage System."

U.S. Appl. No. 16/155,491 filed in the name of Kundan Kumar et al. Oct. 9, 2018, and entitled "Migrating Control of a Multi-Path Logical Device from a Current MPIO Driver to a Target MPIO Driver."

U.S. Appl. No. 16/697,393 filed in the name of Vinay G. Rao et al. Nov. 27, 2019, and entitled "Automated Seamless Migration of Logical Storage Devices."

U.S. Appl. No. 16/710,828 filed in the name of Amit PundalikAnchi et al. Dec. 11, 2019, and entitled "Automated Seamless Migration with Signature Issue Resolution."

International Committee for Information Technology Standards, "SCSI Primary Commands—3 (SPC-3)" Project T10/1416-D, Revision 23, May 4, 2005, 496 pages.

* cited by examiner

ACCESS PATH MANAGEMENT BASED ON PATH CONDITION

FIELD

The field relates generally to information processing systems, and more particularly to storage in information processing systems.

BACKGROUND

Storage arrays and other types of storage systems are often shared by multiple host devices over a network such as, for example, a storage area network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as, for example, migration and replication. Various types of storage access protocols can be used by host devices to access the logical storage volumes or other logical storage devices of the storage system including, by way of example, Small Computer System Interface (SCSI) access protocols. In at least one SCSI access protocol, an Asymmetric Logical Unit Access (ALUA) path state is tracked at the host. The ALUA path state describes SCSI port status and access characteristics, see, e.g., T10 SCSI-3 Specification SPC-3, the disclosure of which is incorporated by reference herein in its entirety. With the ALUA path state, multipathing software in the host can identify paths as fast, slow, or down, and then make path selection decisions.

SUMMARY

Illustrative embodiments provide access path management based on one or more path conditions in an information processing system.

For example, in one embodiment, an apparatus comprises a storage system comprising a processor coupled to a memory. The storage system is configured to communicate over a network with one or more host devices. The storage system is further configured to obtain notification from one of the one or more host devices that a first path through the network between the storage system and the given one of the one or more host devices is at least temporarily unreliable. The storage system is further configured to cause a path state change for the first path from a first state to a second state and a path state change for a second path to the first state.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
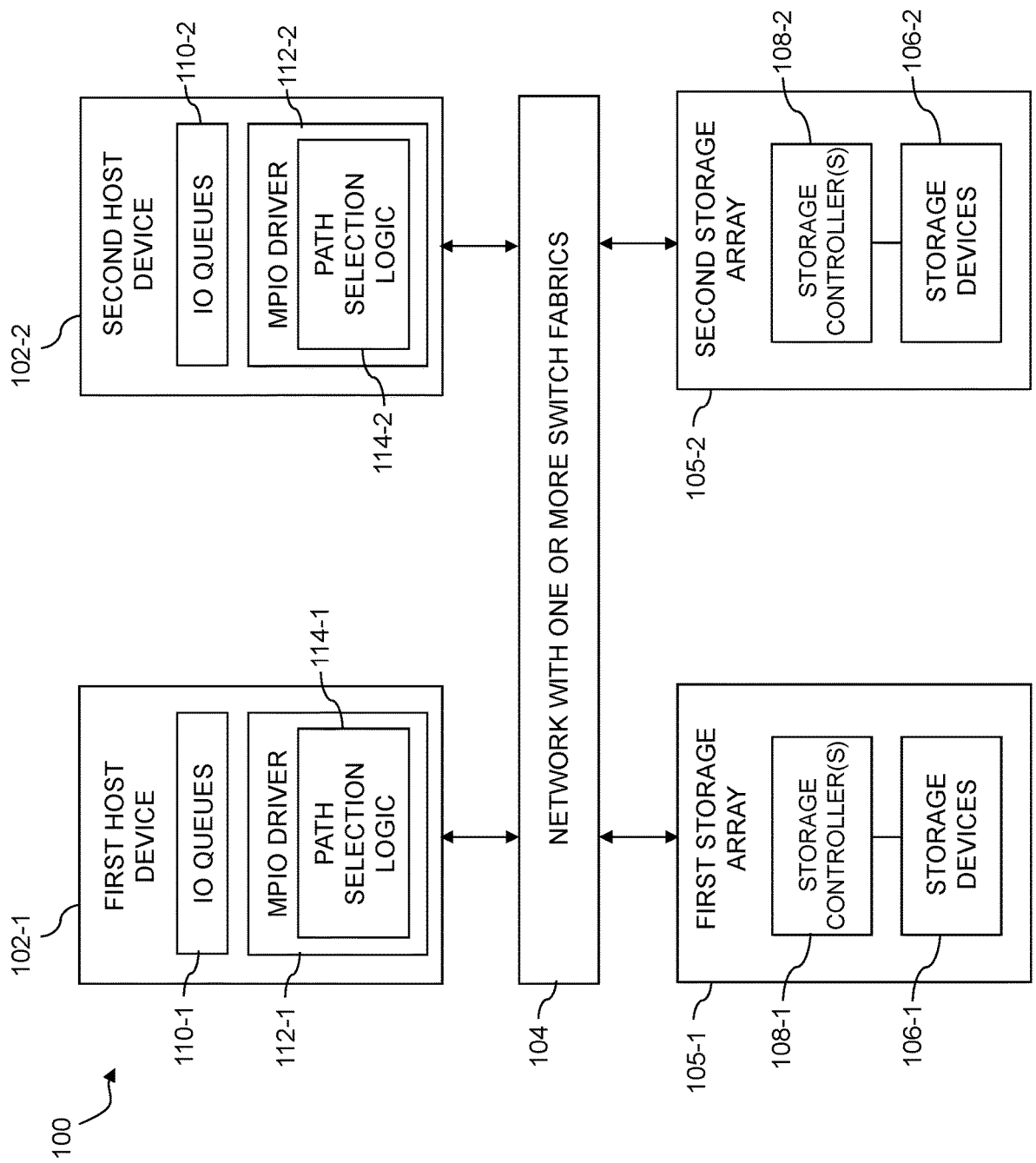
FIG. 1 depicts an information processing system with which one or more illustrative embodiments can be implemented.

FIG. 1 shows an information processing system 100 configured in accordance with an illustrative embodiment. The information processing system 100 comprises at least first and second host devices 102-1 and 102-2, collectively referred to herein as host devices 102. The host devices 102 are coupled to a network 104 that comprises one or more switch fabrics. The host devices 102 communicate over the network 104 via the one or more switch fabrics with at least first and second storage arrays 105-1 and 105-2, collectively referred to herein as storage arrays 105. For example, the network 104 illustratively comprises at least one storage area network (SAN) and the one or more switch fabrics illustratively comprise respective distinct switch fabrics of a set of multiple switch fabrics interconnecting the host devices 102 with the storage arrays 105 over the one or more SANs. Each of the one or more switch fabrics in some embodiments is associated with a different SAN.

The system 100 may be configured such that the first host device 102-1 communicates with the first storage array 105-1 over a first switch fabric and communicates with the second storage array 105-2 over a second switch fabric. Similarly, the second host device 102-2 can communicate with the first storage array 105-1 over the first switch fabric and communicate with the second storage array 105-2 over the second switch fabric. Numerous other interconnection arrangements are possible.

Also, other types of networks can be used in other embodiments, and references to SANs, switch fabrics or other particular network arrangements herein are for purposes of illustration only, as non-limiting examples.

Although only two host devices 102 and two storage arrays 105 are shown in the figure, this is by way of illustrative example only, and other embodiments can include additional instances of such elements. It is also possible that alternative embodiments may include only a single host device.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The storage arrays 105-1 and 105-2 comprise respective sets of storage devices 106-1 and 106-2, collectively referred to herein as storage devices 106, coupled to respective storage controllers 108-1 and 108-2, collectively referred to herein as storage controllers 108.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices.

In some embodiments, at least one of the storage arrays 105 illustratively comprises one or more VNX®, VMAX®, Unity™ or PowerMax™ storage arrays, as well as other commercially available storage arrays from Dell EMC of Hopkinton, Mass.

As another example, one or both of the storage arrays 105 may comprise respective clustered storage systems, each including a plurality of storage nodes interconnected by one or more networks. An example of a clustered storage system of this type is an XtremIO™ storage array from Dell EMC, illustratively implemented in the form of a scale-out all-flash content addressable storage array.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 105 in some embodiments may be implemented as part of cloud infrastructure in the form of a cloud-based system such as an Amazon Web Services (AWS) system. Other examples of cloud-based systems that can be used to provide at least portions of the storage arrays 105 and possibly other portions of system 100 include Google Cloud Platform (GCP) and Microsoft Azure.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on one of the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage arrays 105 implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104.

Such commands in some embodiments more particularly comprise SCSI commands, although other types of commands may be used in other embodiments, including commands that are part of a standard command set, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to stored data of a given one of the storage arrays 105.

Each IO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by the host device 102-1 to one of the storage arrays 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices. The storage devices 106 may therefore be viewed as comprising respective LUNs or other logical storage volumes. Logical storage devices are also referred to herein as simply "logical devices."

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

Additional examples of processing platforms utilized to implement storage systems and possibly one or more associated host devices in illustrative embodiments will be described in more detail below.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/ TCP. Combinations of two or more command protocols may also be implemented.

A given storage volume stored in storage arrays 105 in the system 100 illustratively comprises a set of one or more LUNs or other storage volumes of the storage arrays 105. Each such LUN or other storage volume is assumed to comprise at least a portion of a physical storage space of one or more of the storage devices 106 of the corresponding storage arrays 105.

The host devices 102 comprise respective sets of IO queues 110-1 and 110-2 collectively referred to as IO queues 110, and respective MPIO drivers 112-1 and 112-2 collectively referred to as MPIO drivers 112. The MPIO drivers 112 collectively comprise a multi-path layer of the host devices 102. The multi-path layer provides automated path selection functionality using respective instances of path selection logic 114-1 and 114-2 implemented within the MPIO drivers 112.

The MPIO drivers 112 may comprise, for example, otherwise conventional MPIO drivers, such as PowerPath® drivers from Dell EMC, suitably modified in the manner disclosed herein to support access path state change functionality in the storage arrays 105. Other types of MPIO drivers from other driver vendors may be suitably modified to incorporate functionality for access path state change as disclosed herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. Other types of sources of IO operations may be present in a given implementation of system 100.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of one of the storage arrays 105. The corresponding logical device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers. These and other references to Power-Path® herein are presented by way of illustrative example only, and should not be construed as limiting in any way.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105. For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

As is apparent from the foregoing, MPIO driver 112-1 of host device 102-1 is configured to control delivery of IO operations from the host device 102-1 to the first and second storage arrays 105 over selected paths through the network 104.

It is assumed that the other MPIO driver 112-2 is configured in a manner similar to that described above and elsewhere herein for the first MPIO driver 112-1. The MPIO driver 112-2 is therefore similarly configured to select IO operations from its corresponding one of the sets of IO queues 110 for delivery to the storage arrays 105 over the network 104 and to perform at least portions of the disclosed functionality. Accordingly, aspects of functionality described above in the context of the first MPIO driver 112-1 and the first host device 102-1 are assumed to be similarly performed by the other MPIO driver 112-2 and the other host device 102-2.

The MPIO drivers 112 may be otherwise configured utilizing well-known MPIO functionality such as that described in "Dell EMC SC Series Storage and Microsoft Multipath I/O," Dell EMC, CML1004, July 2018, which is incorporated by reference herein. Such conventional MPIO functionality is suitably modified in illustrative embodiments disclosed herein to support access path state change functionality as will be further described below.

It is to be appreciated that the above-described features of system 100 and other features of other illustrative embodiments are presented by way of example only, and should not be construed as limiting in any way. Accordingly, different numbers, types and arrangements of system components such as host devices 102, network 104, storage arrays 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, instances of migration control logic implemented in the host devices 102 and the storage arrays 105 can be used to perform at least portions of the non-disruptive transformation functionality.

Particular processing operations and other system functionality described herein are presented by way of illustrative example only, and should not be construed as limiting the scope of the disclosure in any way. Alternative embodiments can use other types of processing operations involving host devices, storage systems and access path state change functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different arrangements within a given information processing system.

Functionality can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 2:
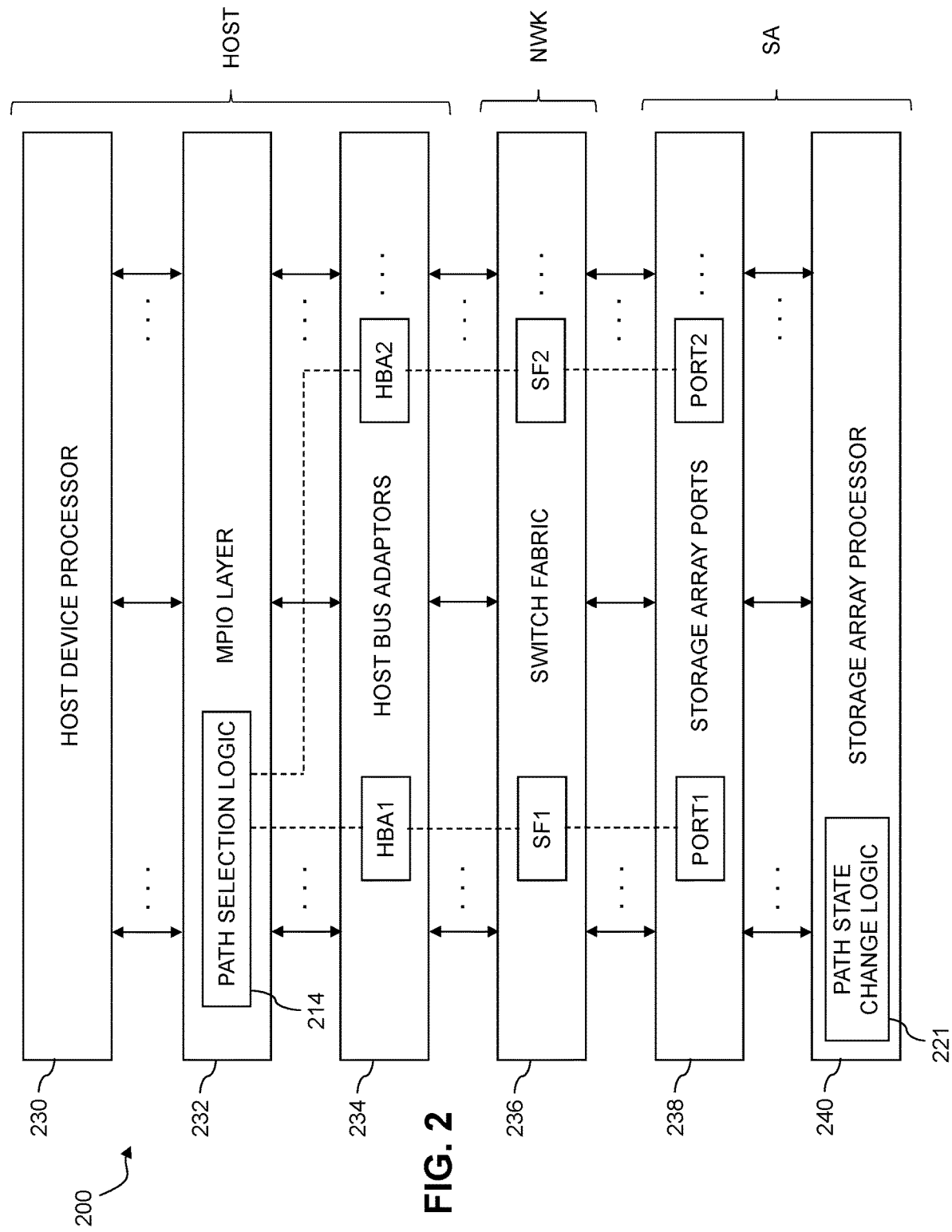
FIG. 2 depicts an information processing system with access path state change functionalities according to an illustrative embodiment.

Referring now to FIG. 2, another illustrative embodiment is shown. In this embodiment, an information processing system 200 comprises host-side path selection logic 214 and storage-side path state change logic 221. The system 200 is configured in accordance with a layered system architecture that illustratively includes a host device processor layer 230, an MPIO layer 232, an HBA layer 234, a switch fabric layer 236, a storage array port layer 238 and a storage array processor layer 240. As illustrated in the figure, the host device processor layer 230, the MPIO layer 232 and the HBA layer 234 are associated with one or more host devices, the switch fabric layer 236 is associated with one or more SANs or other types of networks, and the storage array port layer 238 and storage array processor layer 240 are associated with one or more storage arrays ("SAs").

The system 200 in this embodiment implements access path state change functionalities assumed to be controlled at least in part by storage-side path state change logic 221, although other arrangements are possible. Access path state change functionalities will be described in detail below in the context of FIGS. 3, 4 and 5.

The MPIO layer 232 is an example of what is also referred to herein as a multi-path layer, and comprises one or more MPIO drivers implemented in respective host devices. Each such MPIO driver illustratively comprises an instance of path selection logic 214 configured to perform path selection for delivery of IO operations to the storage arrays of system 200 as previously described.

In the system 200, path selection logic 214 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 2 embodiment can illustratively have a set of n paths to a shared storage array, or alternatively different ones of the host devices can have different numbers and types of paths to the storage array.

The path selection logic 214 of the MPIO layer 232 in this embodiment therefore selects paths for delivery of IO operations to the one or more storage arrays having the storage array ports of the storage array port layer 238.

Some implementations of the system 200 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 200 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Turning now to access path state change functionalities according to illustrative embodiments, recall as explained above that LUNs from a storage array are accessed from one or more hosts via different SAN paths. Most optimal paths may be determined by the path selection logic (114 in FIGS. 1 and 214 in FIG. 2) using the above-mentioned ALUA path state. As mentioned, ALUA is a standard way to describe SCSI port status and access characteristics. With ALUA state, multipathing software (e.g., MPIO driver 112-1 and 112-2 in FIG. 1 and MPIO layer 232 in FIG. 2) in the host device can determine paths as fast, slow, or down. Moreover, transitions between these states are possible as per SCSI standards. Currently, several storage arrays are ALUA compliant and support at least a few ALUA path states. By way of example only, ALUA path states supported by some Dell EMC arrays are as follows:

VNX®—Active-Optimized (AO) and Active-Non-Optimized (ANO)

Unity™ array support—Active-Optimized and Active-Non-Optimized Note that Unavailable is another possible ALUA path state as will be further explained below.

In some embodiments, storage arrays (e.g., 106 in FIG. 1) have multiple storage controllers for servicing the IO which is sent from host devices and the LUNs are primarily "owned" by one storage controller. Typically, the path from the host initiator to the storage controller which owns the LUN is the most optimal path to access the LUN and its corresponding ALUA patch state will be designated as Active-Optimized (AO). Multipathing software such as PowerPath® makes sure that IO is sent via Active-Optimized paths, so long as paths with such path state exist.

However, if a SAN component has an issue such as, but not limited to, switch port/congestion/inter-switch link (ISL) issues, there could be intermittent errors (unreliability) seen with affected IO. Multipathing software quickly marks the corresponding path for path testing. However, issues such as the above SAN component examples can be temporary, i.e., a path test returns as successful and PowerPath® again starts using the path for IO dispatch. These operations iterate and in turn affect IO performance because of multiple retries and path tests.

To attempt to mitigate these issues, multipathing software such as PowerPath® marks the path as at least temporarily unreliable or "flaky" (or "flakey") standby and will not send IO on a marked path unless there are no Active-Optimized paths available. If flakiness is observed on all AO paths, multipathing software has no other choice but to continue dispatching IOs on paths detected as flaky. This degrades IO performance. However, existing storage arrays have no knowledge of present fabric status and, hence, existing storage arrays are not able to make effective use of ALUA standards for performance tuning.

Illustrative embodiments make storage arrays aware of the intermittent unreliability or flakiness observed in IO paths to enable them to make necessary modifications to LUN ownership such that a host has an Active-Optimized path via a different controller and to make sure effective load balancing is achieved based on fabric conditions. More particularly, in one illustrative embodiment, a methodology is provided which enables a storage array to handle ALUA path state change for a LUN from Active-Optimized to Active-Non-Optimized or Active-Non-Optimized to Active-Optimized based on one or more fabric conditions. This in turn helps achieve improved IO performance.

Figure 3:
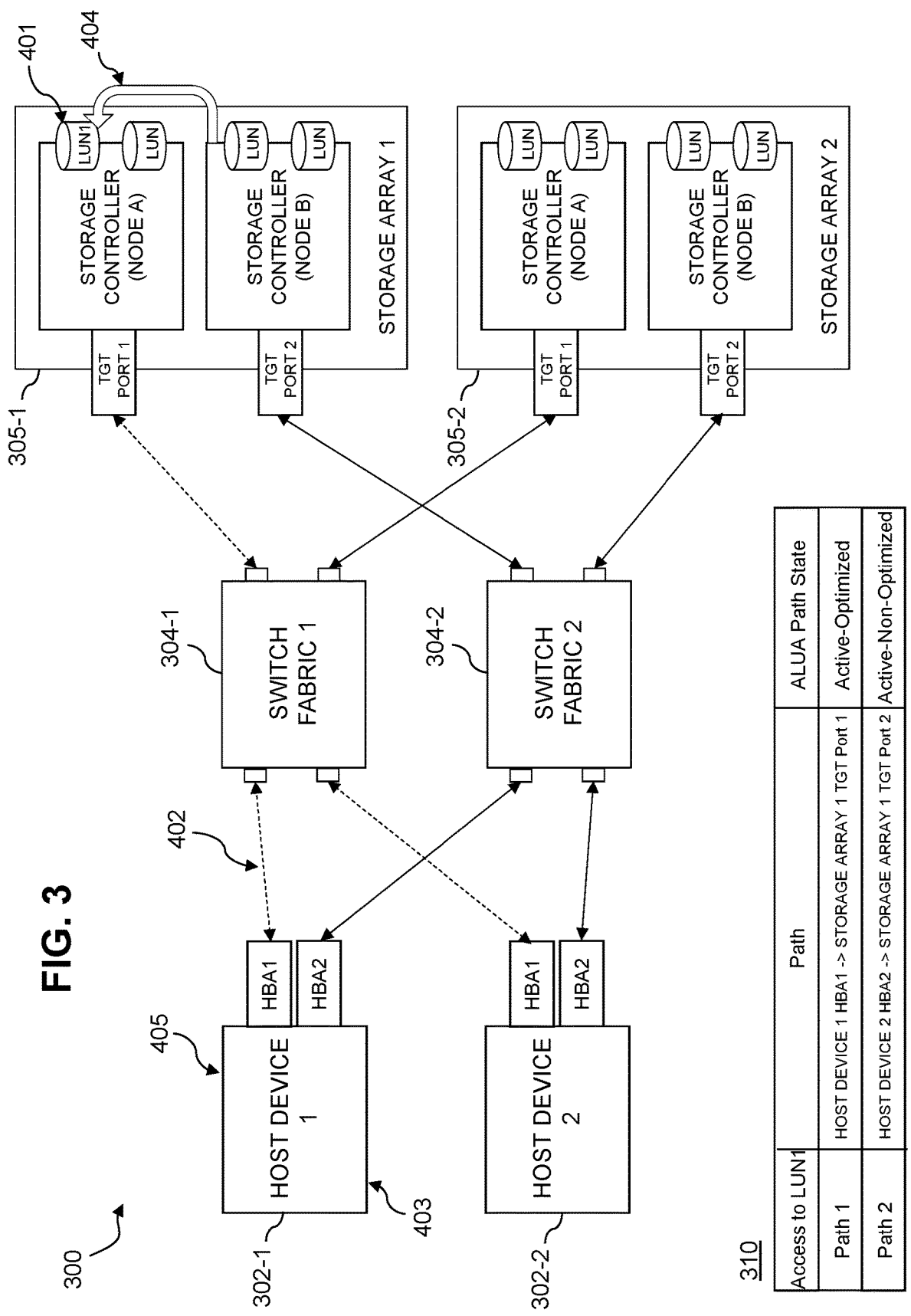
FIG. 3 depicts an information processing system with access path state change functionalities according to an illustrative embodiment.

FIG. 3 illustrates an information processing system 300 configured in accordance with an illustrative embodiment. The information processing system 300 comprises at least first and second host devices 302-1 and 302-2, collectively referred to herein as host devices 302. The host devices 302 are coupled to at least first and second switch fabrics 304-1 and 304-2, collectively referred to herein as switch fabrics 304. The host devices 302 communicate over the switch fabrics 304 with at least first and second storage arrays 305-1 and 305-2, collectively referred to herein as storage arrays 305. Information processing system 300 is configured similarly to information processing system 100 (FIG. 1) and/or information processing system 200 (FIG. 2), i.e., system 300 can be configured with one or more of the various implementations and/or alternatives described above with respect to systems 100 and 200, as well as other implementations and/or alternatives. Note that reference numerals 401 through 405 will be further explained below in the context of FIG. 4.

As shown in FIG. 3, each of the host devices 302 are depicted as including host bus adaptors HBA1 and HBA2 (although a host device can have a different number of host bus adaptors than illustrated). Further, each of storage arrays 305 are depicted as including target ports TGT Port 1 and TGT Port 2 (although a storage array can have a different number of target ports than illustrated). As further shown for each of the storage arrays 305, TGT Port 1 is associated with a first storage controller (referred to as Node A) and TGT Port 2 is associated with a second node controller (referred to as Node B). Each storage controller has a plurality of LUNs assigned thereto that it controls (i.e., owns). Note also that each of switch fabrics 304 have multiple switch ports (not specifically numbered in FIG. 3 or limited by the number of ports illustrated).

Thus, as further depicted, each storage controller (Node A and Node B) of each of storage arrays 305 and their corresponding LUNs are able to be seen by both host devices 302-1 and 302-2. Based on ALUA state, LUNs will have some paths defined as Active-Optimized and some paths defined as Active-Non-Optimized. Table 310 in FIG. 3 illustrates two exemplary paths.

More particularly, in accordance with the ALUA standard, TGT Port 1 of Node A is given a distinctive asymmetric access state (i.e., "access path state," "path state" or just "state" as used herein) that denotes the optimization of port(s) on Node A (i.e., TGT Port 1) as compared to port(s) on Node B (i.e., TGT Port 2). In other words, assume that to initiators (HBAs) in host devices 302 that LUN1 is owned by Node A. Thus, for host devices 302, it is better to access LUN1 via Node A. As such, paths to TGT Port 1 on Node A are Active-Optimized, while paths to TGT Port 2 on Node B are Active-Non-Optimized. The Unavailable state in the ALUA standard is a path state with respect to a given storage controller, e.g., Node A in storage array 1, that is neither Active-Optimized or Active-Non-Optimized, e.g., a path to a LUN in storage array 2.

Further, it is assumed that each of host devices 302 is configured with multipathing software such as, for example, PowerPath®. The multipathing software provides several functions, examples of which include:

(i) Each of host devices 302 gets access to LUNs via multiple paths and the multipathing software running on the given one of the host devices 302 claims storage devices (LUNs).

(ii) Based on a defined ALUA state for a LUN, a path from the initiator (HBA of one of the host devices 302) to one node of one of the storage arrays 305 (either Node A or Node B) is set to Active-Optimized and a path from the initiator to another node is set to Active-Non-Optimized.

(iii) The multipathing software on each of the host devices 302 dispatches IOs to Active-Optimized paths.

(iv) In case of any switch fabric issue which can cause flakiness (i.e., intermittent unreliability) in the SAN (e.g., due to switch port issues, ISL issues, congestion, HBA issues, etc.), the multipathing software in each of the host devices 302 detects the flakiness on a path and, to avoid unnecessary retries, marks the path as standby and stops dispatching IOs to that path.

(v) The multipathing software on each of the host devices 302 notifies the affected one of the storage arrays 305 about the flakiness in the switch fabric as seen from the perspective of an initiator-target pair (e.g., HBA-TGT Port). In one or more embodiments, notification from each of the host devices 302 to the affected one of the storage arrays 305 can be either via SCSI command (e.g., storage array vendor unique) or via Representational State Transfer (REST) calls.

Turning now to the storage array-side, if an issue (flaky path) is reported from one or more host devices for the same target port, the affected one of the storage arrays 305 concludes there is a potential issue with a switch fabric to which one of its storage controllers is connected. The affected one of the storage arrays 305 evaluates the load on another storage controller and decides on corrective actions such as but not limited to:

(i) Make an ALUA path state change, so that affected paths which are detected as Active-Optimized are changed to Active-Non-Optimized, and/or paths which are Active-Non-Optimized are changed to Active-Optimized based on the ALUA path state change.

(ii) Since the affected one of the storage arrays 305 can perform these tasks based on present load conditions in the storage array controller, host devices 302 can get improved (e.g., best possible) IO performance.

(iii) If the storage system has multiple storage arrays, as is the case in FIG. 3 (i.e., storage array 305-1 and 305-2) and if initiator login to each storage array is known or otherwise obtained, a first storage array (e.g., 305-1) can initiate LUN migration from itself to a second storage array (e.g., 305-2) in real-time (on the fly or contemporaneous with the flaky path issue) without any down time when there is flakiness observed with respect to the target ports of the first storage array. During this case, the ALUA path state changes from Unavailable to Active-Optimized.

Figure 4:
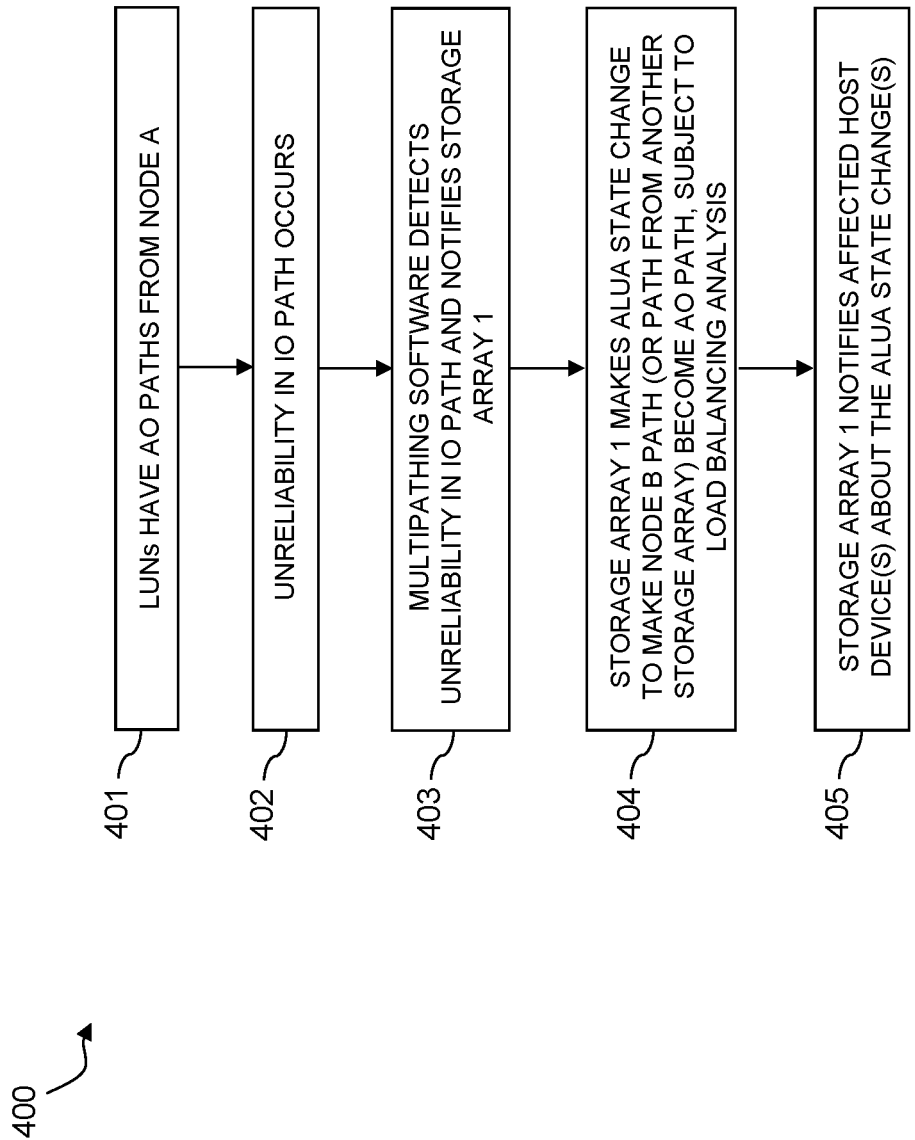
FIG. 4 depicts a methodology for access path state change according to an illustrative embodiment.

FIG. 4 depicts a methodology 400 that illustrates access path state change and LUN ownership modification performed by a storage array as depicted in FIG. 3. In step 401, assume LUNs owned by Node A of storage array 305-1 have Active-Optimized (AO) paths from Node A. In step 402, assume that intermittent unreliability (flakiness), as described above, occurs in at least one existing AO path (denoted by the dashed line in FIG. 3). In step 403, the multipathing software in host device 302-1 detects the unreliability and notifies storage array 305-1. By way of example, notification can be sent via a reliable path or via some other communication protocol and/or channel established between host device 302-1 and storage array 305-1. In step 404, storage array 305-1 makes the ALUA state change to make the Node B path (or a path from storage array 305-2) become the AO path, subject to a load balancing analysis as mentioned above. Load balancing can be performed, for example, in typical manner. In step 405, storage array 305-1 notifies the affected host device 302-1 about the ALUA state changes, e.g., through one of the multipaths existing therebetween and/or through some other communication channel.

Figure 5:
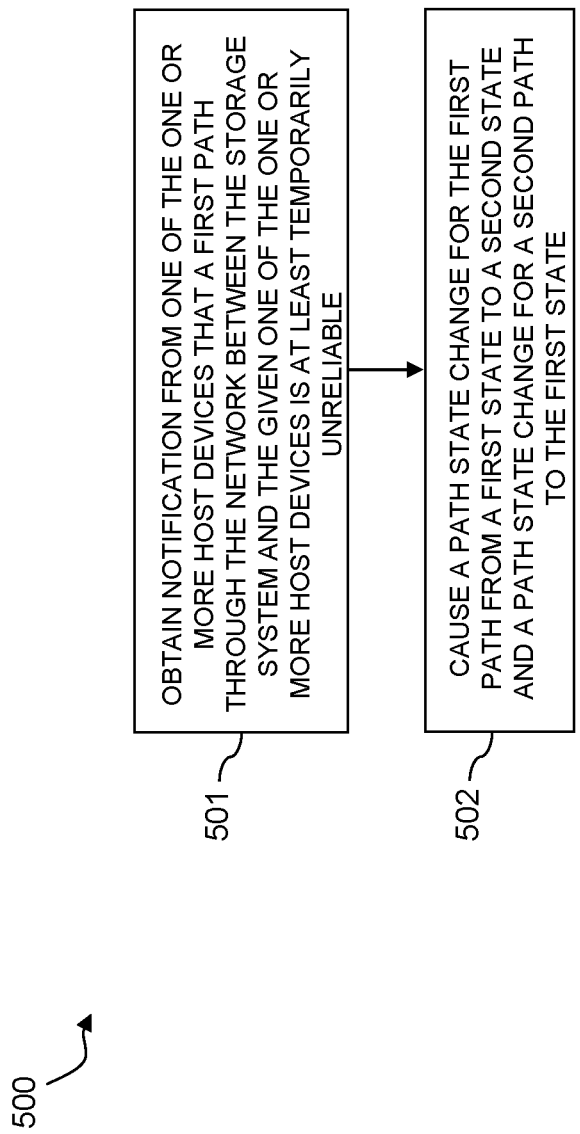
FIG. 5 depicts a methodology for access path state change from a perspective of a storage system according to an illustrative embodiment.

FIG. 5 depicts a path state change methodology 500 from the perspective of a storage system (e.g., including a given storage controller in a storage array such as Node A in storage array 1 in FIG. 3). As shown, step 501 obtains notification from one of the one or more host devices that a first path through a network between the storage system and the given one of the one or more host devices is at least temporarily unreliable (e.g., flaky network condition as mentioned above). Step 502 causes a path state change for the first path from a first state to a second state and a path state change for a second path to the first state. Thus, with reference back to table 310, Path 1 to LUN1 would change from Active-Optimized to Active-Non-Optimized, and Path 2 would change from Active-Non-Optimized to Active-Optimized. If the second path is through a different storage array, then the state of that path would change from Unavailable to Active-Optimized.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system.

Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102/302, network 104/304 and storage arrays 105/305 are illustratively implemented in the form of software running on one or more processing devices. As a more particular example, the instances of path selection logic 214 and path state change logic 221 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, access path state change control logic and additional or alternative components. Also, the particular configurations of system and device elements and associated processing operations illustratively shown in the drawings can be varied in other embodiments. For example, a wide variety of different host device, MPIO driver and storage system configurations and associated arrangements for access path state change functionalities across access protocols can be used in other embodiments. Moreover, the various assumptions made above in the course of describing the illustrative embodiments should also be viewed as exemplary rather than as requirements or limitations.

What is claimed is:

1. An apparatus comprising:
a storage system comprising a processor coupled to a memory;
the storage system being configured to communicate over a network with one or more host devices;
the storage system being further configured to:
obtain notification from one of the one or more host devices that a first path through the network between the storage system and the given one of the one or more host devices is at least temporarily unreliable; and
cause, in response at least in part to the notification, a path state change for the first path from a first state to a second state and a path state change for a second path to the first state;
wherein the storage system comprises at least one storage controller such that the storage controller performs causing the path state change for the first path from the first state to the second state and the path state change for the second path to the first state;
wherein the second path has a previous state of one of active-non-optimized and unavailable prior to becoming active-optimized; and
wherein the causing of the path state change for the first path from the first state to the second state and the path state change for the second path to the first state is done subject to a load balancing analysis.

2. The apparatus of claim 1, wherein the first state is an active-optimized path and the second state is active-non-optimized.

3. The apparatus of claim 1, wherein the first path includes a first target port of the storage system and the second path includes a second target port of the storage system.

4. The apparatus of claim 1, wherein the first path includes a target port of the storage system and the second path includes a target port of a different storage system.

5. The apparatus of claim 1, wherein the path state change is defined by a given access protocol.

6. The apparatus of claim 5, wherein the given access protocol is a Small Computer System Interface-based access protocol.

7. The apparatus of claim 1, wherein the notification obtained from the given one of the one or more host devices is indicative that multipathing software executing on the given one of the one or more host devices identified at least one issue in the network with respect to the first path.

8. The apparatus of claim 7, wherein the at least one issue comprises one of a switch fabric port issue, an inter-switch fabric link issue and a switch fabric congestion issue.

9. A method performed by a storage system configured to communicate over a network with one or more host devices, comprising:
  obtaining notification from one of the one or more host devices that a first path through the network between the storage system and the given one of the one or more host devices is at least temporarily unreliable; and
  causing, in response at least in part to the notification, a path state change for the first path from a first state to a second state and a path state change for a second path to the first state;
  wherein the storage system comprises at least one storage controller such that the storage controller performs causing the path state change for the first path from the first state to the second state and the path state change for the second path to the first state;
  wherein the notification obtained from the given one of the one or more host devices is indicative that multipathing software executing on the given one of the one or more host devices identified at least one issue in the network with respect to the first path;
  wherein the causing of the path state change for the first path from the first state to the second state and the path state change for the second path to the first state is done subject to a load balancing analysis; and
  wherein the storage system comprises a processor coupled to a memory.

10. The method of claim 9, wherein the first state is an active-optimized path and the second state is active-non-optimized, and the second path has a previous state of one of active-non-optimized and unavailable prior to becoming active-optimized.

11. The method of claim 9, wherein the first path includes a first target port of the storage system and the second path includes a second target port of the storage system.

12. The method of claim 9, wherein the first path includes a target port of the storage system and the second path includes a target port of a different storage system.

13. The method of claim 9, wherein the path state change is defined by a Small Computer System Interface-based access protocol.

14. A computer program product comprising a non-transitory processor-readable storage medium having stored therein program code of one or more software programs, wherein the program code, when executed by a storage system comprising a processor coupled to a memory and configured to communicate over a network with one or more host devices, causes the storage system to:
  obtain notification from one of the one or more host devices that a first path through the network between the storage system and the given one of the one or more host devices is at least temporarily unreliable; and
  cause, in response at least in part to the notification, a path state change for the first path from a first state to a second state and a path state change for a second path to the first state;
  wherein the storage system comprises at least one storage controller such that the storage controller performs causing the path state change for the first path from the first state to the second state and the path state change for the second path to the first state;
  wherein the second path has a previous state of one of active-non-optimized and unavailable prior to becoming active-optimized; and
  wherein the causing of the path state change for the first path from the first state to the second state and the path state change for the second path to the first state is done subject to a load balancing analysis.

15. The computer program product of claim 14, wherein the first state is an active-optimized path.

16. The computer program product of claim 14, wherein the first path includes a target port of the storage system and the second path includes a target port of a different storage system.

17. The computer program product of claim 14, wherein the first path includes a first target port of the storage system and the second path includes a second target port of the storage system.

18. The computer program product of claim 14, wherein the notification obtained from the given one of the one or more host devices is indicative that multipathing software executing on the given one of the one or more host devices identified at least one issue in the network with respect to the first path.

19. The computer program product of claim 14, wherein the path state change is defined by a given access protocol.

20. The computer program product of claim 14, wherein the notification obtained from the given one of the one or more host devices is indicative that multipathing software executing on the given one of the one or more host devices identified at least one issue in the network with respect to the first path.

* * * * *